United States Patent [19]

McKinney et al.

[11] 4,040,945

[45] Aug. 9, 1977

[54] HYDROCARBON CATALYTIC CRACKING PROCESS

[75] Inventors: Joel D. McKinney, Pittsburgh; Bruce R. Mitchell, Sarver, both of Pa.

[73] Assignee: Gulf Research & Development Company, Pittsburgh, Pa.

[21] Appl. No.: 646,020

[22] Filed: Jan. 2, 1976

[51] Int. Cl.² .......................... C10G 11/04; B01J 8/24
[52] U.S. Cl. .................................... 208/113; 208/120; 208/164; 252/416
[58] Field of Search ............................... 208/113–121; 252/416, 417

[56] References Cited

U.S. PATENT DOCUMENTS

| 2,480,494 | 8/1949 | Mathy | 208/121 |
| 2,901,419 | 8/1959 | Brill | 208/119 |
| 3,696,025 | 10/1972 | Chessmore et al. | 208/113 |
| 3,909,392 | 9/1975 | Horecky et al. | 208/120 |
| 3,977,963 | 8/1976 | Readal et al. | 208/120 |

Primary Examiner—Delbert E. Gantz
Assistant Examiner—G. E. Schmitkons

[57] ABSTRACT

An improved hydrocarbon catalytic cracking process which comprises introducing tin into the cracking zone so as to maintain a volume ratio of carbon dioxide to carbon monoxide in the gaseous effluent from the catalyst regeneration zone of at least 3.0.

7 Claims, No Drawings

HYDROCARBON CATALYTIC CRACKING PROCESS

BACKGROUND OF THE INVENTION

Catalytic cracking processes are conventionally employed to produce gasoline and light distillate fractions from heavier hydrocarbon feed stocks. These cracking processes include fixed bed operations and fluid catalytic riser cracking processes. The catalysts employed in such conventional processes for the cracking of hydrocarbons boiling substantially above 600° F. Generally contain silica or silica-alumina, such materials frequently being associated with zeolitic materials. The zeolitic materials which are conventionally ion exchanged with suitable cations such as the rare earths can be natural occurring or could have been produced by conventional ion exchange methods so as to provide metallic ions which improve the catalyst activity of the molecular sieve zeolitic-modified silica-alumina catalysts.

Examples of cracking catalysts to which the method of this invention is applicable include those obtained by admixing an inorganic oxide gel with an aluminosilicate and aluminosilicate compositions which are strongly acidic in character as a result of treatment with a fluid medium containing at least one rare earth metal cation and a hydrogen ion or one capable of conversion to a hydrogen ion. Other cracking catalyst compositions which can be employed in conventional processes and the process of this invention include those crystalline aluminosilicate zeolites having a mordenite crystal structure.

Petroleum charge stocks to the catalytic cracking processes contain metals which are generally in an organometallo form, such as in a porphyrin or naphthenate with such metals tending to be deposited in a relatively non-volatile form onto the catalyst. Those metals contained as contaminants in hydrocarbon feeds to the catalytic processes include nickel, vanadium, copper, chromium, and iron. The accumulation of such metal contaminants onto the catalyst may exceed 1500 parts per million nickel equivalents (ppm nickel + 0.2 ppm vanadium).

As an integral step of the hydrocarbon cracking process, the cracking catalyst is regenerated by heating the catalyst to elevated temperatures generally in the range of about 800° to about 1600° F. (427° to 871° C.) for a period of time ranging from 3 to 30 minutes, in the presence of a free oxygen-containing gas. This process step in a separate regenerator is conducted so as to reduce the concentration of the carbon on the catalyst to less than 0.3 weight percent.

Conventional operation of the regeneration step results in the production of carbon dioxide and carbon monoxide which are withdrawn from the regenerator in the effluent gaseous stream. Normally, the ratio of carbon dioxide to carbon monoxide on a volume basis is less than 2.0. If the volume ratio of carbon dioxide to carbon monoxide at a constant excess oxygen and substantially constant regenerator bed temperature could be increased in the regeneration zone, there would result an increase in the heat of combustion from the coke. This increased heat of combustion would increase bed temperature at constant coke make and would result in desirably reduced levels of carbon on regenerated catalyst and improved gasoline and light distillate products yields of the cracking process.

A greater heat release in the regeneration zone from the more complete conversion of th carbon monoxide to carbon dioxide can be an aid in heat balancing the process of cracking low boiling feeds, hydrogenated feeds and paraffinic charge stocks. Such feed stocks have low aromatic carbon contents ($C_A$) as defined by the following classification method:

$$C_A = 0.2514 + 0.00065\ T_w + 0.0086\ S - 0.00605 \times AnPt + 0.00257\ (AnPt/Sp.Gr.)\ \text{where}$$

$T_w$ = Weight average boiling point (° F.)
AnPt = Aniline Point, ASTM D-611, (° F.)
S = to Weight percent sulfur
Sp.Gr. = Specific gravity (60/60° F.).

When the $C_A$ value is lower than 12 volume percent the coke yield may not be sufficient to provide the heat required to satisfy the reactor heat duty at normal carbon monoxide to carbon dioxide ratio levels.

SUMMARY OF THE INVENTION

In the catalytic cracking of hydrocarbon feed stocks and the regeneration of the catalyst containing at least 1500 ppm nickel equivalent metal contaminants recovered from the catalytic cracking zone, a process which comprises passing tin to the cracking zone so as to maintain a volume ratio of carbon dioxide to carbon monoxide of at least 3.0 in the gaseous effluent withdrawn from the catalyst regeneration zone. The catalyst is heated in a single regeneration step to a temperature in the range of about 800° to about 1600° F. (427° to 871° C.), preferably about 1160° to 1260° F. (627° to 682° C.) in the presence of a free-oxygen containing gas so as to reduce the concentration on the carbon on the catalyst to less than 0.3 percent.

DESCRIPTION OF PREFERRED EMBODIMENTS

The invention is directed to the regeneration of cracking catalyst compositions as previously described and containing at least 1500 ppm nickel equivalent metal contaminants and is particularly applicable to cracking catalysts containing at least 2500 ppm nickel equivalent metal contaminants. Although not to be limited thereto, a preferred method of conducting the catalytic cracking process is by fluid catalytic cracking using riser outlet temperatures between about 900° to 1100° F. (482° to 593° C.). The invention will hereafter be described as it relates to a fluid catalytic cracking process although those skilled in the art will readily recognize that the invention is equally applicable to those catalytic cracking processes employing a fixed catalyst bed.

Under fluid catalytic cracking conditions the cracking occurs in the presence of a fluidized composited catalyst in an elongated reactor tube commonly referred to as a riser. Generally, the riser has a length to diameter ratio of about 20. The charge stock is passed through a preheater which heats the feed to a temperature of about 600° F. (316° C.) and the heated feed is then charged into the bottom of the riser.

In operation, a contact time (based on feed) of up to 15 seconds and catalyst to oil weight ratios of about 4:1 to about 15:1 are employed. Steam can be introduced into the oil inlet line to the riser and/or introduced independently to the bottom of the riser so as to assist in carrying regenerated catalyst upwardly through the riser. Regenerated catalyst at temperatures generally between about 1100° and 1350° F. (593° to 732° C.) is introduced into the bottom of the riser.

The riser system at a pressure in the range of about 5 to about 50 psig (.35 to 3.50 kg/cm²) is normally operated with catalyst and hydrocarbon feed flowing concurrently into and upwardly into the riser at about the same flow velocity, thereby avoiding any significant slippage of catalyst relative to hydrocarbon in the riser and avoiding formation of a catalyst bed in the reaction flow stream. In this manner the catalyst to oil ratio thus increases significantly from the riser inlet along the reaction flow stream.

The riser temperature drops along the riser length due to heating and vaporization of the feed, the slightly endothermic nature of the cracking reaction and heat loss to the atmosphere. As nearly all the cracking occurs within one or two seconds, it is necessary that feed vaporization occurs nearly instantaneously upon contact of feed and regenerated catalyst at the bottom of the riser. Therefore, at the riser inlet, the hot, regenerated catalyst and preheated feed, generally together with a mixing agent such as steam, (as hereto described) nitrogen, methane, ethane or other light gas, are intimately admixed to achieve an equilibrium temperature nearly instantaneously.

The catalyst containing at least 1500 ppm nickel equivalents and carbon in excess of 0.3 weight percent is separated from the hydrocarbon product effluent withdrawn from the reactor and passed to a regenerator. In the regenerator the catalyst is heated to a temperature in the range of about 800° to about 1600° F. (427° to 871° C.), preferably 1160° to 1260° F. (627° to 682° C.), for a period of time ranging from 3 to 30 minutes in the presence of a free-oxygen containing gas. This burning step is conducted so as to reduce the concentration of the carbon on the catalyst to less than 0.3 weight percent by conversion of the carbon to carbon monoxide and carbon dioxide.

The carbon dioxide and carbon monoxide produced in the regeneration step are withdrawn from the regenerator with the effluent gaseous stream. Improvement of the carbon dioxide/carbon monoxide ratio produced in the regeneration step can be effected by the addition of tin to the cracking zone and the cracking catalysts contained therein. A tin compound can be introduced directly into the cracking zone or preferably, can be introduced into the hydrocarbon feed passed to the cracking zone so as to maintain a carbon dioxide to carbon monoxide ratio in the gaseous effluent withdrawn from the regeneration zone of at least 3.0.

In a preferred method of practicing the invention, the volume ratio of carbon dioxide to carbon monoxide in the gaseous effluent withdrawn from the regeneration zone employing a single burning step is measured and the addition of tin to the hydrocarbon feed to the cracking zone adjusted responsive thereto so as to maintain a $CO_2/CO$ ratio of at least 3.0 in the regeneration zone effluent. Normally, the volume ratio is maintained in the range of 3.0 to 9.0. The controlled ratio of carbon monoxide to carbon dioxide can be maintained by the addition of a compound of tin to the hydrocarbon feed passed to the cracking zone. Suitable tin compounds to be introduced into the hydrocarbon feed to the cracking zone include tetraphenyl tin, hexabutyl tin, tetrabutyl tin, tetraethyl tin, tetra-n-propyl tin and any other oil soluble tin compound. Such compounds are those which are readily convertible to the oxide upon subjecting the catalyst composition containing the tin treating agent to regeneration.

Although as previously indicated, the amount of tin which is added to the hydrocarbon feed and thus applied to the catalyst can be adjusted responsive to the volume ratio of carbon dioxide to carbon monoxide in the regeneration zone effluent, the tin is generally applied to the catalyst in a total amount in the range of 0.2 to 0.8 weight percent of the catalyst in the cracking zone. Normally, the amount of tin added to the hydrocarbon feed to the catalytic cracking zone will range from about 3 ppm to 3,000 ppm, preferably from 100 to 1,500 ppm, based upon the hydrocarbon feed to the cracking zone.

The tin compound can be added to the hydrocarbon feed directly or by employing suitable carrying agents. For example, the tin compound can be dissolved and dispersed in a hydrocarbon solvent such as benzene and the solvent added to the charge stock to the cracking process.

It will be appreciated by those skilled in the art that the rate of addition of tin to the hydrocarbon feed passed to the cracking zone will be increased should the volume ratio of carbon dioxide to carbon monoxide in the reaction zone gaseous effluent fall below 3.0. Although not to be limited thereto, should the volume ratio of carbon dioxide to carbon monoxide increase to above 9.0, it may be desirable to reduce the rate of flow of the tin compound to the cracking zone so as to maintain the volume ratio in the range of 3.0 to 9.0.

The charge stocks employed in the catalytic cracking process of this invention are those conventionally utilized in catalytic cracking processes to produce gasoline and light distillate fractions from heavier hydrocarbon feedstocks and generally are those feedstocks having an average boiling temperature above 600° F. (316° C.) and include such materials as gas oils, cycle oils, residuums and the like. The cracking processes to which this invention are applicable are those generally conducted at temperatures between 800° and about 1200° F. (427° and 649° C.) and at pressures within the range of subatmospheric to 3000 psig (210 kg/cm²).

EXAMPLE I

The purpose of this example is to illustrate a conventional catalytic cracking process operated with the catalyst containing a high concentration of metal contaminants. The cracking catalyst composition employed in the fluid catalytic cracking process (FCC) of this example and subsequent Example II was a crystalline aluminosilicate dispersed in a refractory oxide matrix. Other physical characteristics of the catalyst composition as employed included a surface area of 218 square meters per gram, a pore volume of 0.13 cc per gram, and an average pore diameter of 24 A. Chemical analysis of the catalyst composition produced the following results:

|  | Weight % |
|---|---|
| Lanthanum | 3.30 |
| Titanium | 0.29 |
| Alumina | 29.30 |
| Cerium | 0.79 |

The gas oil feed to the FCC process in this example and Example II was characterized as follows:

| Gravity, °API | 24.7 |

| | | |
|---|---|---|
| Sulfur, wt. % | 0.17 | |
| Nitrogen, wt. % | 0.13 | |
| Carbon Residue, Rams, ASTM D525, wt. % | 0.45 | |
| Aniline Point, ASTM D611, °F. | 185 | (85° C.) |
| Viscosity, SUS, ASTM D2161, 210° F. (99° C) | 45.7 | |
| Pour Point, ASTM D97, °F. | +100 | (+38° C.) |
| Nickel, ppm | 1.0 | |
| Vanadium, ppm | 0.2 | |
| Vacuum Distillation ASTM D1160 °F. | | |
| 10% at 760 mm | 598 | (314° C.) |
| 30% | 707 | (375° C.) |
| 50% | 786 | (419° C.) |
| 70% | 860 | (460° C.) |
| 90% | 995 | (535° C.) |

The above-described gas oil feed and catalyst composition containing 4351 ppm nickel and 886 ppm vanadium was charged continuously to a riser reactor operated at the following conditions:

| | | |
|---|---|---|
| Hydrocarbon Feed Inlet Temp.: °F. | 507 | (264° C.) |
| Catalyst Preheat Temp.: °F. | 1119 | (604° C.) |
| Catalyst to Oil Ratio: wt. of catalyst/wt. Fresh Feed | 8.2 | |
| Reaction Zone Average Temp.: °F. | 985 | (529° C.) |
| Riser Outlet Temp.: °F. | 976 | (525° C.) |
| Contact Time, based on Feed: SEC. | 8.76 | |
| Carbon on Regenerated Catalyst: wt. % | 0.3 | |
| Riser Pressure: PSIG | 25.4 | (1.75 kg/cm$^2$) |

The products obtained during this run were as follows:

| | |
|---|---|
| Product Yields: Vol % Of FF | |
| Slurry Oil [650+F (343+C) TBP] | 6.6 |
| Furnace Oil [650F (343C) TBP] | 10.7 |
| Debut. Gaso. [430F (221C) TBP EP] | 56.4 |
| Depent. Gaso. [430F (221C) TBP EP] | 42.8 |
| Heavy Gaso. [430F (221C) TBP EP] | 20.7 |
| Depentanized Light Gasoline | 22.0 |
| Light Hydrocarbons: | |
| Total Pentanes-Pentenes | 13.6 |
| I-Pentane | 9.3 |
| N-Pentane | 1.0 |
| Pentenes | 3.3 |
| Total Butanes-Butenes | 20.5 |
| I-Butane | 9.2 |
| N-Butane | 2.5 |
| Butenes | 8.7 |
| Total Propane-Propylene | 12.3 |
| Propane | 3.3 |
| Propylene | 9.0 |
| Total C3+ Liquid Yield: Vol % FF | 106.4 |
| Conv. To 430F (221C) EP Gaso. And Lighter | |
| WT % Of FF | 80.8 |
| VOL % Of FF | 82.7 |
| Product Yields: wt % Of FF | |
| C$_2$ And Lighter | 3.2 |
| Total Ethane-Ethylene | 1.4 |
| Ethane | 0.6 |
| Ethylene | 0.8 |
| Methane | 1.1 |
| Hydrogen | 0.56 |
| Hydrogen Sulfide | 0.0 |
| Coke By Flue Gas Analysis | 11.5 |

During the run, the catalyst was continuously regenerated in a single burning step employing the following operating conditions:

| | | |
|---|---|---|
| Regenerator Temp.: °F. | 1307 | (708° C.) |
| Air Rate: SCF/HR | 26.3 | (.7448 L/HR) |
| Flue Gas Rate: SCF/HR | 54.4 | (.1606 L/HR) |

Analysis of the flue gas produced the following results:

| | Vol. % |
|---|---|
| Nitrogen | 84.1 |
| Oxygen | 0.8 |
| Carbon Dioxide | 8.6 |
| Carbon Monoxide | 6.8 |
| CO$_2$ / CO Vol Ratio | 1.3 |

EXAMPLE II

In this example, tin was added to the hydrocarbon feed to the riser reactor by introducing tetraphenyl tin into the feed until the concentration of tin on the catalyst totaled 0.66 weight percent, based upon the weight of the catalyst composition. As in Example I, the gas oil feed, containing tin, and the catalyst containing 4351 ppm nickel and 886 ppm vanadium was charged continuously to the riser reactor operated at the following conditions:

| | | |
|---|---|---|
| Hydrocarbon Feed Inlet Temp.: °F. | 529 | (276° C.) |
| Catalyst Preheat Temp.: °F. | 1117 | (603° C.) |
| Catalyst to Oil Ratio: wt. of cataylst/wt. Fresh Feed | 8.5 | |
| Reaction Zone Average Temp.: °F. | 986 | (530° C.) |
| Riser Outlet Temp.: °F. | 978 | (526° C.) |
| Contact Time, based on Feed: SEC. | 8.95 | |
| Carbon on Regenerated Catalyst: wt. % | 0.3 | |
| Riser Pressure: PSIG | 26.3 | (1.82 kg/cm$^2$) |

The products obtained during this run were as follows:

| | |
|---|---|
| Product Yields: Vol % Of FF | |
| Slurry Oil [650+F (343+C) TBP] | 7.2 |
| Furnace Oil [650F (343C) TBP] | 10.7 |
| Debut. Gaso. [430F (221C) TBP EP] | 56.0 |
| Depent. Gaso. [430F (221C) TBP EP] | 42.4 |
| Heavy Gaso. [430F (221C) TBP EP] | 20.2 |
| Depentanized Light Gasoline | 23.8 |
| Light Hydrocarbons: | |
| Total Pentanes-Pentenes | 13.7 |
| I-Pentane | 9.6 |
| N-Pentane | 1.1 |
| Pentenes | 3.0 |
| Total Butanes-Butenes | 20.8 |
| I-Butane | 9.7 |
| N-Butane | 2.7 |
| Butenes | 8.4 |
| Total Propane-Propylene | 12.4 |
| Propane | 3.4 |
| Propylene | 9.0 |
| Total C3+ Liquid Yield: Vol % FF | 107.1 |
| Conv. To 430F (221C) EP Gaso. And Lighter | |
| WT % Of FF | 80.2 |
| VOL % Of FF | 82.1 |
| Product Yields: wt % Of FF | |
| C$_2$ And Lighter | 3.0 |
| Total Ethane-Ethylene | 1.4 |
| Ethane | 0.6 |
| Ethylene | 0.8 |
| Methane | 1.1 |
| Hydrogen | 0.35 |
| Hydrogen Sulfide | 0.1 |
| Coke By Flue Gas Analysis | 11.1 |

During the run, the catalyst was continuously regenerated in a single burning step employing the following results:

| | | |
|---|---|---|
| Regenerator Temp.: ° F. | 13.34 | (7.23° C.) |
| Air Rate: SCF/HR | 29.9 | (.8468 L/HR) |
| Flue Gas Rate: SCF/HR | 57.5 | (.16284 L/HR) |

Analysis of the flue gas produced the following results:

| | Vol. % |
|---|---|
| Nitrogen | 85.4 |
| Oxygen | 0.7 |
| Carbon Dioxide | 12.4 |
| Carbon Monoxide | 1.7 |
| $CO_2$ / CO Vol Ratio | 7.5 |

A comparison of the results obtained in this example and in Example I demonstrates that by the addition of tin to the hydrocarbon feed to a catalytic cracking zone the volume ratio of carbon dioxide to carbon monoxide is increased from 1.3 to 7.5 and that the production of hydrogen, based upon the weight percent of the feed, was reduced from 0.56 to 0.35 without adversely affecting the production of gasoline products in the FCC process.

Although the invention has been described with reference to specific embodiments, references, and details, various modifications and changes will be apparent to one skilled in the art and are contemplated to be embraced in this invention.

We claim:

1. In a process which comprises contacting a hydrocarbon feed with a cracking catalyst containing at least 1500 ppm nickel equivalents as metal contaminants in a cracking zone under cracking conditions and thereafter heating the deactivated catalyst in the presence of oxygen in a regeneration zone; the improvement which comprises introducing tin into said cracking zone so as to maintain a volume ratio of carbon dioxide to carbon monoxide of at least 3.0 in the gaseous effluent withdrawn from said regeneration zone.

2. The process of claim 1 wherein the volume ratio of carbon dioxide to carbon monoxide in said gaseous effluent is maintained in the range of 3.0 to 9.0 by adjusting the rate of flow of tin to said cracking zone responsive to the measurement of carbon dioxide and carbon monoxide in said gaseous effluent.

3. In a process which comprises contacting a hydrocarbon feed with a cracking catalyst containing at least 1500 ppm nickel equivalents as metal contaminants under cracking conditions in a cracking zone and thereafter heating the deactivated catalyst in the presence of oxygen in a regeneration zone; the improvement which comprises determining the carbon dioxide and carbon monoxide concentrations in the gaseous effluent withdrawn from said regeneration zone, and adjusting the rate of flow of a tin compound in the hydrocarbon feed to said cracking zone responsive thereto so as to maintain a volume ratio of carbon dioxide to carbon monoxide in said gaseous effluent of at least 3.0.

4. The process of claim 3 wherein the volume ratio of carbon dioxide to carbon monoxide maintained in said regeneration zone effluent is in the range of 3.0 to 9.0.

5. The process of claim 1 wherein the cracking process is conducted until the concentration of metal contaminants as nickel equivalents on said catalyst is at least 2500 ppm.

6. The process of claim 1 wherein the concentration of tin applied to said catalyst in said cracking zone is in the range of 0.2 to 0.8 weight percent based upon the weight of said catalyst.

7. The process of claim 1 wherein the amount of tin added to the hydrocarbon feed to said cracking zone is in the range from about 3 to 3,000 ppm, based upon the hydrocarbon feed to said cracking zone.

* * * * *